United States Patent
Sankaran (10) Patent No.: US 12,040,856 B2
(45) Date of Patent: Jul. 16, 2024

(54) ONE SHOT MULTI-USER MULTIPLE-INPUT MULTIPLE-OUTPUT (MU-MIMO) RESOURCE PAIRING USING REINFORCEMENT LEARNING BASED DEEP Q NETWORK (DQN)

(71) Applicant: Nokia Solutions and Networks Oy, Espoo (FI)

(72) Inventor: Chandrasekar Sankaran, Hoffman Estates, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 583 days.

(21) Appl. No.: 17/290,930

(22) PCT Filed: Nov. 5, 2019

(86) PCT No.: PCT/EP2019/080217
§ 371 (c)(1),
(2) Date: May 3, 2021

(87) PCT Pub. No.: WO2020/094630
PCT Pub. Date: May 14, 2020

(65) Prior Publication Data
US 2022/0045726 A1 Feb. 10, 2022

(30) Foreign Application Priority Data
Nov. 5, 2018 (FI) ..................................... 20185937

(51) Int. Cl.
*H04B 7/0452* (2017.01)
*G06N 3/006* (2023.01)
(Continued)

(52) U.S. Cl.
CPC ........... *H04B 7/0452* (2013.01); *G06N 3/006* (2013.01); *G06N 3/045* (2023.01); *G06N 3/08* (2013.01); *H04B 7/0695* (2013.01)

(58) Field of Classification Search
CPC .... H04B 7/0452; H04B 7/0695; G06N 3/006; G06N 3/045; G06N 3/08
See application file for complete search history.

(56) References Cited

U.S. PATENT DOCUMENTS

| 9,144,076 B2 | 9/2015 | Yue et al. |
| 2010/0020891 A1 | 1/2010 | Takano |

(Continued)

FOREIGN PATENT DOCUMENTS

| CN | 101558619 A | 10/2009 |
| EP | 2341638 A2 | 7/2011 |

(Continued)

OTHER PUBLICATIONS

Sutton et al., "Reinforcement Learning: An Introduction", A Bradford Book, 2nd edition, Mar. 1, 1998, 352 pages.

(Continued)

*Primary Examiner* — Ashley Shivers
(74) *Attorney, Agent, or Firm* — Mendelsohn Dunleavy, P.C.; Steve Mendelsohn (57) ABSTRACT

Systems, methods, apparatuses, and computer program products for scheduling radio resources across a group of one or more user equipment (UEs) are provided. One method may include encoding every sequence of multi-user multiple-input multiple-output (MU MIMO) beam combinations into a unique numerical value, adding a Q value into the encoded numerical value to produce a Q encoded value ($Q_{encoded}$), providing each of the sequence of beam combinations with a unique designated bin, passing a matrix comprising a state representation for each of the beam (Continued)

combinations through a deep Q network (DQN), and outputting, by the deep Q network (DQN), one or more optimal beams to assign to a user equipment (UE).

20 Claims, 5 Drawing Sheets

(51) Int. Cl.
  *G06N 3/045* (2023.01)
  *G06N 3/08* (2023.01)
  *H04B 7/06* (2006.01)

(56) References Cited

U.S. PATENT DOCUMENTS

| | | | |
|---|---|---|---|
| 2017/0032245 | A1 | 2/2017 | Osband et al. |
| 2019/0014488 | A1* | 1/2019 | Tan .................... G06N 3/044 |
| 2020/0120458 | A1* | 4/2020 | Aldana ................ H04W 72/23 |
| 2021/0014872 | A1 | 1/2021 | Sankaran |
| 2021/0021307 | A1* | 1/2021 | Shattil ................ H04W 72/046 |

FOREIGN PATENT DOCUMENTS

| | | | |
|---|---|---|---|
| WO | 2011140262 | A1 | 11/2011 |
| WO | 2019/190476 | A1 | 10/2019 |
| WO | 2020/002127 | A1 | 1/2020 |

OTHER PUBLICATIONS

Mnih et al., "Human-level Control Through Deep Reinforcement Learning", Nature, vol. 518, Feb. 26, 2015, pp. 529-533.
Klautau et al., "5G MIMO Data for Machine Learning: Application to Beam-Selection Using Deep Learning", Information Theory and Applications Workshop (ITA), Feb. 11-18, 2018, 9 pages.
Wang et al., "MmWave Beam Prediction with Situational Awareness: A Machine Learning Approach", arXiv, May 23, 2018, 5 pages.
Michaloliakos et al., "Joint User-beam Selection for Hybrid Beamforming in Asynchronously Coordinated Multi-cell Networks", Information Theory and Applications Workshop (ITA), January 31-Feb. 5, 2016, 10 pages.
Wang et al., "Deep Reinforcement Learning for Dynamic Multichannel Access in Wireless Networks", arXiv, Feb. 20, 2018, pp. 1-30.
Wang et al., "A Machine Learning Framework for Resource Allocation Assisted by Cloud Computing", arXiv, Dec. 16, 2017, pp. 1-19.
He et al., "Deep-reinforcement-learning-based Optimization for Cache-enabled Opportunistic Interference Alignment Wireless Networks", IEEE Transactions on Vehicular Technology, vol. 66, No. 11, Nov. 2017, pp. 10433-10445.
Search Report received for corresponding Finnish Patent Application No. 20185937, dated Mar. 27, 2019, 4 pages.
Luo et al., "Online Power Control for 5G Wireless Communications: A Deep Q-network Approach", IEEE International Conference on Communications (ICC), May 20-24, 2018, 6 pages.
Vieira et al., "Deep Convolutional Neural Networks for Massive MIMO Fingerprint-Based Positioning", IEEE 28th Annual International Symposium on Personal, Indoor, and Mobile Radio Communications (PIMRC), Oct. 8-13, 2017, 6 pages.
Maksymyuk et al., "Deep Learning Based Massive MIMO Beamforming for 5G Mobile Network", IEEE 4th International Symposium on Wireless Systems within the International Conferences on Intelligent Data Acquisition and Advanced Computing Systems (IDAACS-SWS), Sep. 20-21, 2018, pp. 241-244.
Mismar et al., "Deep Q-Learning for Self-Organizing Networks Fault Management and Radio Performance Improvement", 52nd Asilomar Conference on Signals, Systems, and Computers, Oct. 28-31, 2018, pp. 1457-1461.
Hu et al., "Optimal Transmit Antenna Selection Strategy for MIMO Wiretap Channel Based on Deep Reinforcement Learning", IEEE/CIC International Conference on Communications in China (ICCC), Aug. 16-18, 2018, pp. 803-807.
Office Action received for corresponding Finnish Patent Application No. 20185937, dated May 17, 2019, 10 pages.
Office Action received for corresponding Finnish Application No. 20185937, dated Oct. 17, 2019, 7 pages.
International Search Report and Written Opinion received for corresponding Patent Cooperation Treaty Application No. PCT/EP2019/080217, dated Dec. 12, 2019, 12 pages.
Luong et al., "Applications of Deep Reinforcement Learning in Communications and Networking: A Survey", arXiv, Oct. 18, 2018, pp. 1-37.
Sun et al., "Application of Machine Learning in Wireless Networks: Key Techniques and Open Issues", arXiv, Sep. 24, 2018, pp. 1-27.
First Office Action for corresponding Chinese application No. 201980087345.6; dated Dec. 25, 2023 (12 pages) Machine Translation.

* cited by examiner

| Action | | | | Code | Q | Encoded Q |
|---|---|---|---|---|---|---|
| I1 | I2 | I3 | I4 | | | |
| 0 | | | | 0 | 2.62 | 2.62 |
| 0 | 1 | | | 1 | 0.98 | 3.98 |
| 0 | 1 | 2 | | 2 | 0.31 | 6.31 |
| 0 | 1 | 2 | 3 | 3 | 0.29 | 9.29 |
| 0 | 1 | 2 | 4 | 4 | 1.59 | 13.59 |
| 0 | 1 | 2 | 5 | 5 | 2.83 | 17.83 |
| 0 | 1 | 2 | 6 | 6 | 1.09 | 19.09 |
| 0 | 1 | 3 | | 7 | 0.04 | 21.04 |
| 0 | 1 | 3 | 4 | 8 | 1.02 | 25.02 |
| 0 | 1 | 3 | 5 | 9 | 1.24 | 28.24 |
| 0 | 1 | 3 | 6 | 10 | 2.50 | 32.50 |
| 0 | 1 | 4 | | 11 | 1.34 | 34.34 |
| 0 | 1 | 4 | 5 | 12 | 2.18 | 38.18 |
| 0 | 1 | 4 | 6 | 13 | 0.10 | 39.10 |
| 0 | 1 | 5 | | 14 | 1.71 | 43.71 |
| 0 | 1 | 5 | 6 | 15 | 1.33 | 46.33 |
| 0 | 1 | 6 | | 16 | 0.82 | 48.82 |
| 0 | 2 | | | 17 | 2.54 | 53.54 |
| 0 | 2 | 3 | | 18 | 2.92 | 56.92 |
| 0 | 2 | 3 | 4 | 19 | 1.58 | 58.58 |
| 0 | 2 | 3 | 5 | 20 | 1.42 | 61.42 |
| 0 | 2 | 3 | 6 | 21 | 1.54 | 64.54 |
| 0 | 2 | 4 | | 22 | 0.60 | 66.60 |

- $Q_{encoded} = 3*12 + 2.18 = \mathbf{38.18}$
- $Q\ \ \ \ \ \ \ \ = 38.18\ \%\ 3\ \ = \mathbf{2.18}$
- $Code\ \ \ = 38.18\ /\ 3\ \ = \mathbf{12}$

ONE SHOT MULTI-USER MULTIPLE-INPUT MULTIPLE-OUTPUT (MU-MIMO) RESOURCE PAIRING USING REINFORCEMENT LEARNING BASED DEEP Q NETWORK (DQN)

RELATED APPLICATION

This application was originally filed as PCT Application No. PCT/EP2019/080217, filed on Nov. 5, 2019, which claims priority from Finland Application No. 20185937, filed on Nov. 5, 2018, each of which is incorporated herein by reference in its entirety.

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to the scheduling of radio resources for user equipment (UEs) in such communications systems.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) wireless systems refer to the next generation (NG) of radio systems and network architecture. 5G is mostly built on a new radio (NR), but the 5G (or NG) network can also build on E-UTRA radio. It is estimated that NR will provide bitrates on the order of 10-20 Gbit/s or higher, and will support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in E-UTRAN or eNB in LTE) may be named gNB when built on NR radio and may be named NG-eNB when built on E-UTRA radio.

SUMMARY

Another embodiment is directed to a method that may include encoding every sequence of multi-user multiple-input multiple-output (MU MIMO) beam combinations into a unique numerical value, adding a Q value into the encoded numerical value to produce a Q encoded value ($Q_{encoded}$), providing each of the sequence of beam combinations with a unique designated bin, passing a matrix comprising a state representation through a deep Q network (DQN), and outputting, by the deep Q network (DQN), one or more optimal beams to assign to a user equipment (UE).

Another embodiment is directed to an apparatus, which may include at least one processor and at least one memory comprising computer program code. The at least one memory and computer program code configured, with the at least one processor, to cause the apparatus at least to encode every sequence of multi-user multiple-input multiple-output (MU MIMO) beam combinations into a unique numerical value, add a Q value into the encoded numerical value to produce a Q encoded value ($Q_{encoded}$), provide each of the sequence of beam combinations with a unique designated bin, pass a matrix comprising a state representation for each of the beam combinations through a deep Q network (DQN), and output, by the deep Q network (DQN), one or more optimal beams to assign to a user equipment (UE).

Another embodiment is directed to an apparatus that may include encoding means for encoding every sequence of multi-user multiple-input multiple-output (MU MIMO) beam combinations into a unique numerical value, adding means for adding a Q value into the encoded numerical value to produce a Q encoded value ($Q_{encoded}$), providing means for providing each of the sequence of beam combinations with a unique designated bin, passing means for passing a matrix comprising a state representation for each of the beam combinations through a deep Q network (DQN), and outputting means for outputting, by the deep Q network (DQN), one or more optimal beams to assign to a user equipment (UE).

Another embodiment is directed to an apparatus that may include circuitry configured for encoding every sequence of multi-user multiple-input multiple-output (MU MIMO) beam combinations into a unique numerical value, circuitry configured for adding a Q value into the encoded numerical value to produce a Q encoded value ($Q_{encoded}$), circuitry configured for providing each of the sequence of beam combinations with a unique designated bin, circuitry configured for passing a matrix comprising a state representation for each of the beam combinations through a deep Q network (DQN), and circuitry configured for outputting, by the deep Q network (DQN), one or more optimal beams to assign to a user equipment (UE).

Another embodiment is directed to a computer readable medium comprising program instructions stored thereon for performing at least a method including encoding every sequence of multi-user multiple-input multiple-output (MU MIMO) beam combinations into a unique numerical value, adding a Q value into the encoded numerical value to produce a Q encoded value ($Q_{encoded}$), providing each of the sequence of beam combinations with a unique designated bin, passing a matrix comprising a state representation through a deep Q network (DQN), and outputting, by the deep Q network (DQN), one or more optimal beams to assign to a user equipment (UE).

BRIEF DESCRIPTION OF THE DRAWINGS

For proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for scheduling radio resources across a group of UEs, for example applying multi-user multiple-input multiple-output (MU-MIMO), is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles and teachings of certain example embodiments, and not in limitation thereof.

Certain embodiments described herein relate to the topic of scheduling radio resources across a group of one or more competing UEs, for example, in a non-iterative (one-shot) manner so as to maximize the sum total throughput across the set of UEs. Some embodiments may be applicable to 5G, as well as other types of RANs, and MU-MIMO. In addition, certain embodiments may utilize reinforcement learning, Q-learning and/or convolutional neural network based deep Q learning as a machine learning framework.

In a multi-user MIMO (MU-MIMO) system, a base station (BS) with multiple antennas may communicate with multiple users. Typically, the BS amplifies and shifts the phases of the transmitted or received signals at each antenna in order to improve the signal quality of data streams (i.e., diversity combining) or to simultaneously send or receive multiple data streams to one or more users (i.e., spatial multiplexing). The amplification, phase shifting, and combining of the signals at the antennas can be thought of as applying a set of "weights" to the signal and forming "beams" toward a certain spatial direction relative to the antenna orientation. Each beam may enhance the relative received/transmitted signal strength towards some directions while decreasing the relative signal strength towards other directions.

Figure 1:
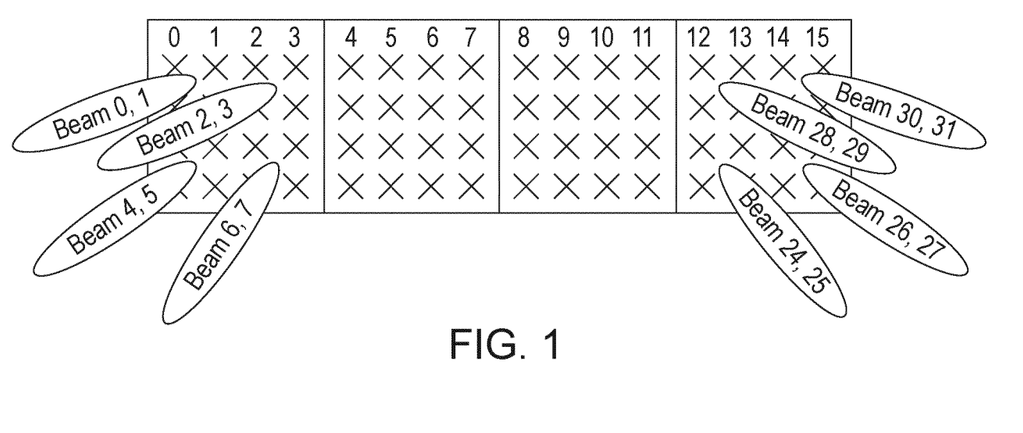
FIG. 1 illustrates a system depicting a sub-cell forming multiple beams to focus the signal energy in different directions, according to an embodiment.

In 5G MU-MIMO, each cell has multiple sub-cells each having its own antenna array and with multiple UEs possible in each sub-cell. As illustrated in the example of FIG. 1, using the antenna array, the sub-cell forms multiple beams that are meant to focus the signal energy in different directions within the cell's coverage area. The UEs, based on their location, may pick one of the beams as their best beam.

The scheduler in the cell assigns (i.e., pairs) beams to active UEs on a per transmission time interval (TTI) basis and the objective is to maximize the total system throughput. There may be a limit on the number of UEs that can be scheduled simultaneously based on control channel or other limitations.

Some previous approaches had proposed an iterative solution where, at every iteration, a single pairing is done, and then move on to the next stage for the next pairing, and so on, until the maximum number of pairings is completed (e.g., if 5 pairings are needed, then 5 iterations are completed before coming up with the final beam assignments). However, such iterative methods can take up precious processing time when there may be critical time constraints while performing beam selections on real time basis. The processing time scales linearly with the number of beams that need to be selected, and this may not be desirable for time critical real time scheduling needs.

Figure 2:
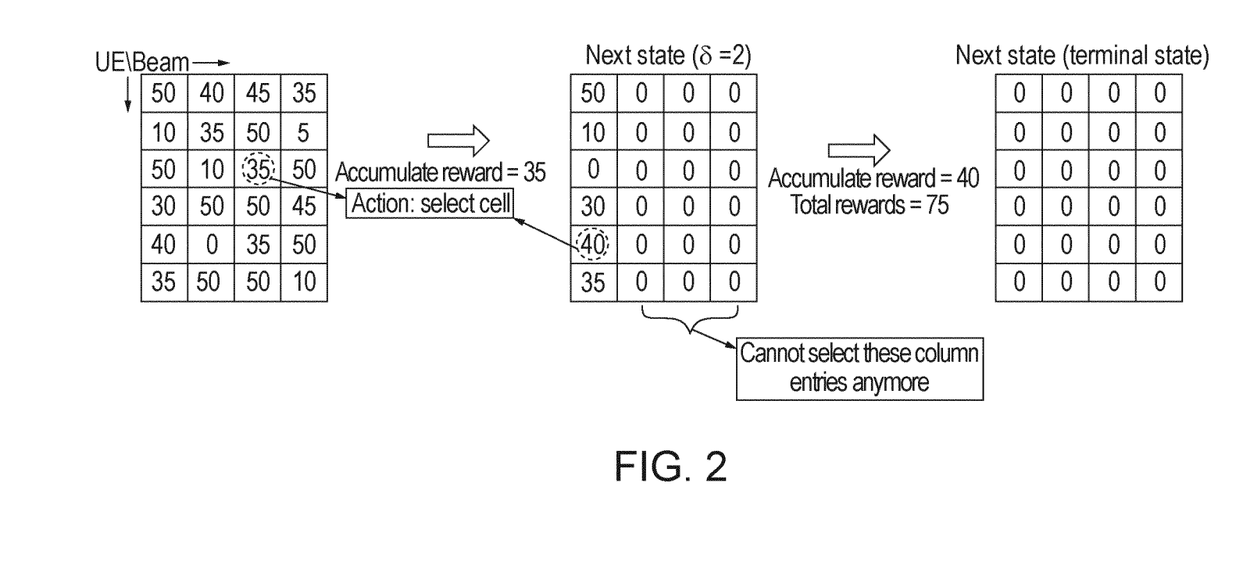
FIG. 2 illustrates an example of an approach using the matrix (D) of proportional fair (PF) values and a specified set of rules to provide a solution by treating the matrix entries as pixel values in a reinforcement learning based deep Q network (DQN) formulation, according to an embodiment.

One approach uses the matrix (D) of proportional fair (PF) values and a specified set of rules (that enable a Markovian evolution for the matrix) to provide a solution by treating the matrix entries as pixel values in a reinforcement learning based deep Q network (DQN) formulation. According to this approach, the assignment is done in an iterative manner in which, based on the UE-beam selected for the current iteration, the matrix D changes for the next iteration. An example of this approach is depicted in FIG. 2.

Figure 3:
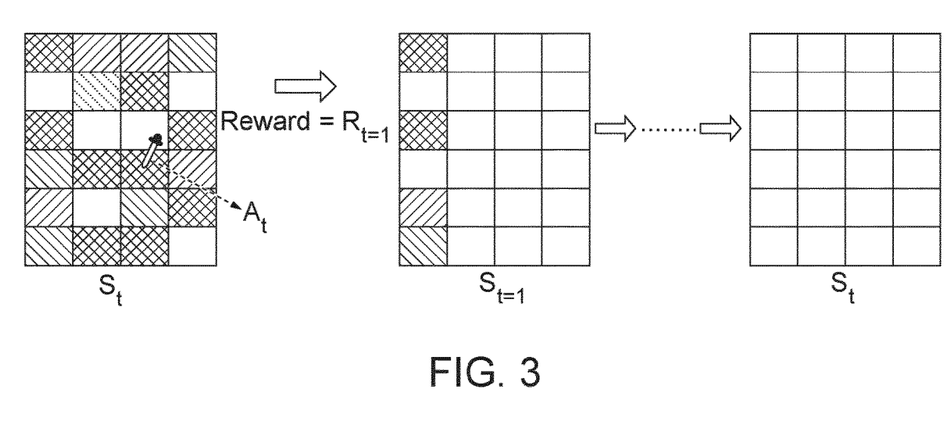
FIG. 3 illustrates an example of, given selecting an action from a matrix of states resulting in a certain reward, according to an embodiment.

As illustrated in the example of FIG. 3, given a current matrix (state, $S_t$), a cell (action, $A_t$) can be selected, resulting in a reward ($R_{t+1}$, which is the PF metric corresponding to the cell), added to a cumulative return. Cells in some rows and/or columns will potentially be unavailable for the next state ($S_{t+1}$). The aim is to find an optimal policy ($\pi^*$) that maps states to actions so as to maximize the cumulative return_$G_t = \Sigma_{k=0}^{T} \gamma R_{t+k+1}$, where $0 \leq \gamma \leq 1$ is a discount parameter.

The optimum action-value function ($Q^*$) is defined as: $Q^*(s, a) = \max_\pi E[G_t/S_t=s, A_t=a, \pi]$, where $\pi$ is a policy mapping states to actions. In other words, $Q^*(s, a)$ is the maximum expected return achievable by following any strategy, after seeing state s and taking action a. $Q^*$ is estimated using a neural network as a function approximator (with weights $\theta$), i.e., $Q^*(s, a) \approx Q(s, a; \theta)$.

Figure 4:
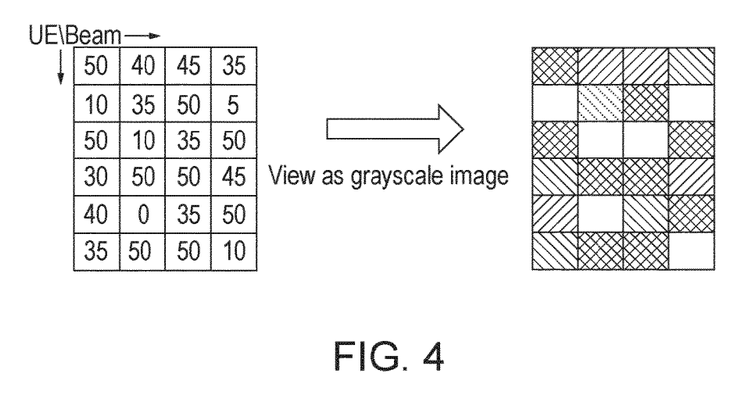
FIG. 4 illustrates an example matrix depicting each state as an image (i.e., PF metrics as pixel values), according to an embodiment.

As illustrated in the example of FIG. 4, considering each state as an image (i.e., PF metrics as pixel values), there is a structure/pattern to each state. Neural networks are very efficient at coming up with good features for structured data. Convolutional layers are excellent at detecting local pattern in images. For instance, multi-layer Convolutional Neural Network (CNN) in conjunction with a Q-network leads to the deep Q-network (DQN), a powerful framework that was proposed to solve for $Q^*$. The aim is to let the DQN play the game enough number of times so that, based on the rewards it receives through the game stages, it can find an optimal path from any initial state to the terminal state so as to maximize the cumulative rewards. Once the DQN is trained, the online solution involves passing the states $S_t, S_{t+1}, \ldots$ in an iterative manner through the trained DQN to obtain the selections.

Example embodiments provide an approach that enables a one-shot pairing where all pairings and/or selections are performed at once, thereby eliminating the need for iterations (thus, if 5 pairings are needed, then all 5 of them are determined at once).

In the following, the broad framework of selecting entries from a matrix of values is referred to as the problem of selecting beams. Since there are a finite number of selections or iterations (because the number of beams that can be assigned in any given TTI is limited), one embodiment is configured to enumerate all possible selection combinations of beams. Then, some embodiments provide at least two solutions for the one-shot selection process. One solution is a regression based approach and another solution is a classification based approach, which will be discussed in more detail below.

As introduced above, some embodiments may utilize a Q-learning or deep Q network (DQN) approach. According to a DQN approach, a Q function Q(s,a) gives the sum of the immediate reward r of choosing action a in state s and the optimum reward from the next state, s', onwards:

$$Q(s, a) = r(s, a) + \max_{a'} Q(s', a'),$$

where s' is the next state visited by the system from state s when action a is chosen.

According to an embodiment of a regression approach, every possible sequence of beam selections or combinations (e.g., each possible pairing of beams-to-UEs) may be encoded into a unique numerical value. According to an example, each of the possible sequence of beam combinations has an associated Q value. In this embodiment, the Q value at any stage is added onto the beam encoded numerical value and this combined value may be referred to as $Q_{encoded}$ in examples discussed herein. In an embodiment, each sequence of beams may be given a unique designated bin, i.e., no other sequence will have its $Q_{encoded}$ value falling in this designated bin. Then, an online process may be performed in which the state representation/input matrix is passed through a trained DQN and the resulting output uniquely identifies the sequence of selected beams and the maximizing Q-value. In other words, in this embodiment, the output of the trained DQN may include the $Q_{encoded}$ of the optimal beam sequence that should be selected.

According to an embodiment of a classification approach, the numerical value corresponding to the beam sequence may be converted into a binary code and the DQN may be trained to predict the binary code (the Q value at every stage can be obtained from the corresponding binary code).

As introduced above, in an embodiment of a regression approach, a trained DQN may be utilized to output the optimum beam for selection. According to certain embodiments, iterations may be used in the training process, where the training is such that each stage of the iteration learns the best action that it can take and the best action sequence from the next stage on. Once trained, during the online process the 1st stage itself can predict the entire sequence of actions (i.e., $S_t$ is able to predict all the beam selections, no need to pass $S_{t+1}, S_{t+2}, \ldots$ through the DQN).

According to certain embodiments, the training of the DQN may include letting M=Total number of beams (or possible actions) and n=maximum number of beams (actions) to be selected. At each iteration, the maximum number of action choices=M+1, corresponding to selecting one of M unselected beams, or the null action (action M) of not selecting any more beams. The null action ensures that it is not always needed to select n beams, but instead k≤n beams.

In an embodiment, the total number of possible action sequences may be given by: $L=\Sigma_{k=1}^{n} M_{C_k}$, where $M_{C_k}$ denotes the number of combinations possible when selecting k beams out of M beams. Each action sequence ($A_k$) is of the form $A_k=[a_0, a_1, \ldots, a_{k-1}]$ (iterations 0 through k−1), 1≤k≤n, where $a_i \in \{0, 1, \ldots M-1\}$ denotes the beam selected in iteration i, 0≤i≤k−1. Action sequence $A_k$ is encoded as $C_{A_k}$ such that the inverse $C_{A_k}^{-1}$ results in a unique $A_k$.

According to some embodiments, limiting the total number of sequences to L requires encoding action sequences after re-arranging the actions in $A_k=[a_0, a_1, \ldots, a_{k-1}]$ such that $a_i < a_{i+1}$ (i.e., a single combination represents all the permutations of the actions within the sequence). One embodiment may include letting $\hat{Q}$=upper bound on Q value encountered at any iteration (i.e., $\hat{Q} > Q_{max}$) and letting β≥1 denote a scale factor that is used for increasing the bin separation, such that $\hat{Q}\beta$ is an integer and the size of the designated bin for each beam sequence=$\hat{Q}\beta$.

In certain embodiments, by design the code $C_{A_k}$ for action sequence $A_k$ is unique across all possible action sequences $A_k$ (1≤k≤n). Thus, the designated bin for action sequence $A_k$ is $[\hat{Q}\beta *C_{A_k}, \hat{Q}\beta *(C_{A_k}+1)]$. The $Q_{encoded}$ value for $A_k$ will fall strictly in this bin.

According to some embodiments, the encoding and decoding may be performed as follows. Where Q(S) denotes the Q value for state S with the Q achieving action sequence being $A_k$, Q(S) may be encoded as: $Q_{encoded}(S)=[\hat{Q}\beta *C_{A_k} + Q(S)]$. It is noted that, in example embodiments described herein, $Q_{encoded}$ captures all the actions from the current iteration until the terminal state (i.e., the action sequence) and also the Q value. Then, given a $Q_{encoded}(S)$, the Q value, Q(S) may be decoded as: $Q(S)=[Q_{encoded}(S, A_k) \% \hat{Q}\beta]$ (i.e., remainder operation). $C_{A_k}$ (and thus, the action sequence $A_k$) may be decoded as: $C_{A_k}=[Q_{encoded}(S, A_k)/\hat{Q}\beta]$ (integer division, i.e., quotient operation).

In view of the above, in example embodiments, the Q-learning training/update for DQN is:

$$Q(S) = \max_a [R(a) + Q(S_{next}(a))]$$

(note that only the Q value gets used in the max operation, not the encoded Q value), where $S_{next}(a)$ is the resulting state after taking action a in state S, Q ($S_{next}(a)$ and $A_k$ are obtained by decoding $Q_{encoded}(S_{next}(a), A_k)$. Q(S) is encoded as:

$$Q_{encoded}(S, A_{k+1}) = \left[\hat{Q}\beta * C_{A_{k+1}} + \max_a [R(a) + Q(S_{next}(a))]\right],$$

where $A_{k+1}=[a_0=a^*, A_k]$, with $a^*$ being the max achieving action above (i.e., $A_{k+1}$ is obtained by prepending $A_k$ with the best action for the current stage). It is noted that, according to example embodiments described herein, an action sequence $A_k$ may represent an assignment of beam(s) to UE(s).

According to certain embodiments, $Q_{encoded}(S)$ values may be used in the DQN batch fitting process (using an appropriately designed convolutional neural network, CNN) to obtain the trained DQN. Thus, each stage is able to extract (decode) the Q value and the corresponding action sequence from its downstream stages, perform its computations and compute a new Q value and a new action sequence (by pre-pending its best action to the extracted action sequence) and pass this result (encode) on to its upstream stages.

Figure 5:
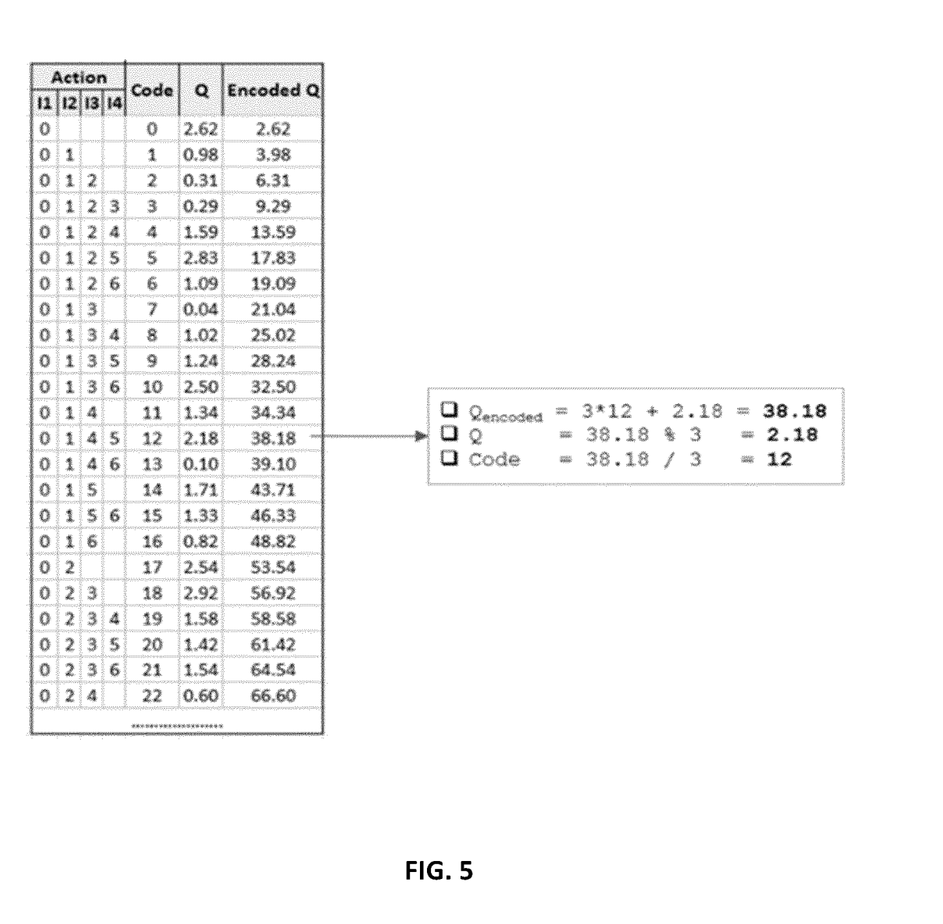
FIG. 5 illustrates a table depicting an example of the encoding and decoding operations based on one example.

FIG. 5 illustrates a table depicting an example of the encoding and decoding operations based on the following example: let M=7 beams (beams 0 through 6), n=4 selections (actions for iterations I1 through I4), β=1, and $\hat{Q}β$ (i.e., size of each designated bin)=3 (thus no Q value will be greater than 3). In this example, the action sequences can be of length 1, 2, 3 or 4, and each sequence is assigned a fully invertible code as shown (to limit the size of the table only 23 sequences are shown). For illustration purposes, the Q values are generated to be random values in the range (0,3); and the resulting encoded Q values ($Q_{encoded}$) are as shown. Also shown is an example of how the code and the Q value may be extracted (decoded) from a $Q_{encoded}$ value. It is noted that FIG. 5 illustrates just one example, and other embodiments are not limited to the example illustrated in FIG. 5. For instance, other embodiments may include a different number of beams, selections, encoding schemes, and/or bin sizes.

Once the DQN is trained as discussed above and it is time for real time predictions, according to example embodiments, there is no need for iterations to compute the optimal action sequence (i.e., the optimal beam selection), since the first stage would have learned to predict the best action sequence—the one shot process is to pass the initial state S through the trained DQN to obtain $Q_{encoded}(S, A_k)$; decoding $Q_{encoded}(S, A_k)$ provides the chosen action sequence $A_k$ (i.e., all the beam assignments).

As outlined above, an embodiment of a regression approach uses the $Q_{encoded}$ values, which are real numbered/continuous valued. As introduced above, another embodiment may employ a classification approach. According to this embodiment, since Q(S) can be computed from $C_{A_k}$, $C_{A_k}$ may be converted to a binary bit stream representation and train the DQN to learn and predict only this binary bit stream. Since there are $L=\Sigma_{j=1}^{n} MCj$ possible action sequences, the DQN would require at least $B=\lceil \log_2 L \rceil$ bits as outputs to predict the action sequence (each $A_k$ would be encoded as a unique B bit sequence). In an embodiment, more than B bits can be used to add redundancy to the process to improve the performance. This classification approach can also be used in a supervised learning setup where the desired action sequence $A_k$ is the result of some other algorithm that we would like a neural network to learn (e.g., a deep neural network, DNN).

Figure 6:
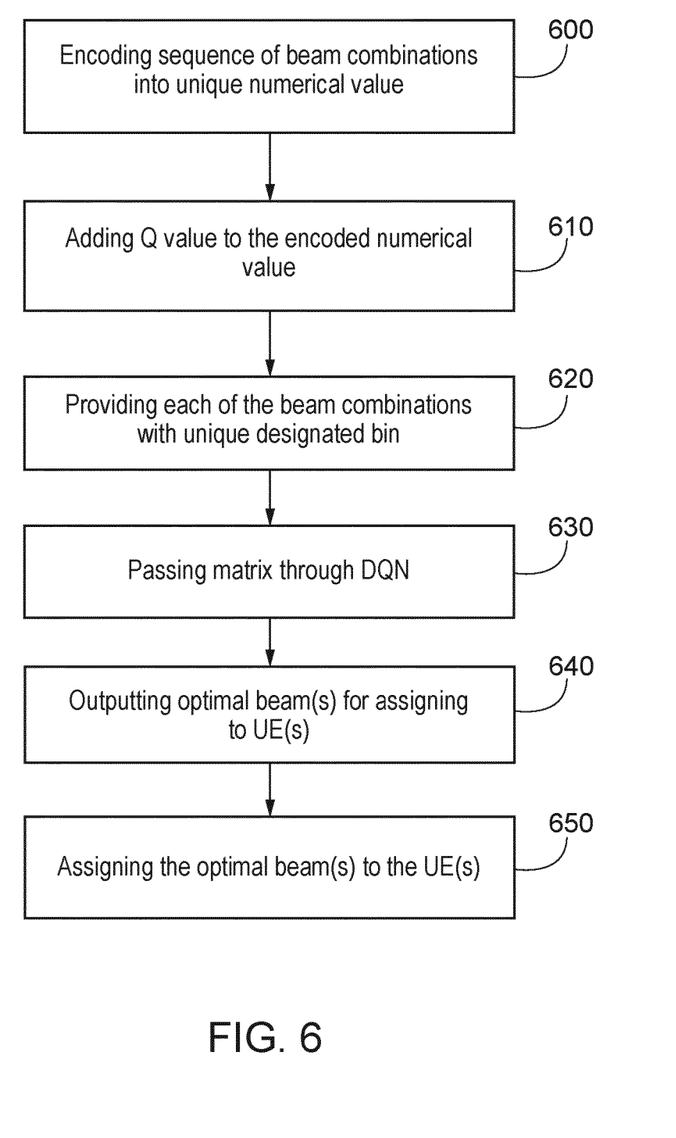
FIG. 6 illustrates an example flow diagram of a method, according to certain embodiments.

FIG. 6 illustrates an example flow diagram of a method for selecting MU-MIMO beams to assign to one or more active UE(s), according to one embodiment. In an embodiment, the method of FIG. 6 may utilize a DQN to select the beams for assignment to the UE(s) in order to maximize total system throughput. In certain example embodiments, the flow diagram of FIG. 6 may be performed by a network entity or network node in a 3GPP communication system, such as LTE or 5G NR. For instance, in some example embodiments, the method of FIG. 6 may be performed by a base station, eNB, gNB, or the like in a LTE, 5G or NR system.

In one embodiment, the method of FIG. 6 may include, at 600, encoding every possible sequence of MU-MIMO beam combinations (i.e., each possible pairing of beam(s) to UE(s)) into a unique numerical value and, at 610, adding a Q value into the encoded numerical value to produce a Q encoded value ($Q_{encoded}$). For example, in certain embodiments, each of the beam combinations may have an associated Q value and this is the Q value that is added to the unique numerical value encoding the beam combinations.

According to an embodiment, the method may include, at 620, providing each of the sequence of beam combinations with a unique designated bin, e.g., such that no other sequence of beam combinations will have its Q encoded value ($Q_{encoded}$) falling within that designated bin. In certain embodiments, the method may then include, at 630, passing a matrix comprising the input state representation through a DQN. According to one embodiment, the method may further include, at 640, outputting, by the DQN, one or more optimal beam(s) to assign to one or more UE(s). For example, the outputting 640 may include outputting a unique identifier of the sequence of selected beam(s) and the maximizing Q value. In other words, in one embodiment, the DQN may be configured to output the Q encoded value ($Q_{encoded}$) for the optimal beam combination(s) that should be selected for assignment to the UE(s). In an embodiment, the method may also include, at 650, assigning, to the UE(s), the optimal beam(s) outputted by the deep Q network (DQN).

According to some embodiments, the method of FIG. 6 may also include training the DQN such that all of the optimal beam(s) are predicted in the first stage of the trained DQN. In other words, according to an example, the training of the DQN is such that each stage of a training iteration learns the best action that it can take and the best action sequence from the next stage on. Once the DQN is trained, during the online process the first stage itself can predict the entire sequence of actions (i.e., $S_t$ is able to predict all the beam selections, no need to pass $S_{t+1}$, $S_{t+2}$, . . . through the DQN).

In an embodiment, the training of the DQN may include encoding an action sequence, $A_k$, representing an assignment of beam(s) to the UE(s) as code $C_{A_k}$ such that the inverse $C_{A_k}^{-1}$ results in a unique $A_k$, where each said action sequence, $A_k$, is of the form $A_k=[a_0, a_1, \ldots, a_{k-1}]$, 1≤k≤n, and $a_i \in \{0, 1, \ldots M-1\}$ denotes the beam selected in iteration i, 0≤i≤k−1. Then, according to an embodiment, a total number of possible action sequences is given by: $L=\Sigma_{k=1}^{n}M_{C_k}$, where $M_{C_k}$ denotes the number of combinations possible when selecting k beams out of M beams, and where M represents the total number of beams, and n represents the maximum number of beams to be selected. According to certain embodiments, limiting the total number of sequences to L may include encoding action sequences after re-arranging the actions in $A_k=[a_0, a_1, \ldots, a_{k-1}]$ such that $a_i<a_{i+1}$.

In some embodiments, the size of the designated bin for each sequence of beam combinations may be given by: $\hat{Q}β$, wherein $\hat{Q}$ represents an upper bound on the Q value encountered at any iteration and β≥1 denotes a scale factor that is used for increasing the bin separation, such that $\hat{Q}β$ is an integer. Further, in an embodiment, the code $C_{A_k}$ for action sequence $A_k$ is unique across all possible action sequences $A_k$, and the designated bin for action sequence $A_k$ is given by $[\hat{Q}β*C_{A_k}, \hat{Q}β*(C_{A_k}+1)]$.

According to certain embodiments, the encoding 600 may include encoding Q(S) as $Q_{encoded}(S)=[\hat{Q}β*C_{A_k}+Q(S)]$, where Q(S) denotes the Q value for state S with the Q achieving action sequence being $A_k$. Then, given a $Q_{encoded}(S)$, the method may further include decoding the Q value, Q (S), as follows: $Q(S)=[Q_{encoded}(S, A_k) \% \hat{Q}\beta]$ (i.e., remainder operation), and decoding $C_{A_k}$ as follows: $C_{A_k}= [Q_{encoded}(S, A_k)/\hat{Q}\beta]$ (integer division, i.e., quotient operation).

In one embodiment, the training of the DQN may also include computing $$Q(S) = \max_a [R(a) + Q(S_{next}(a))],$$

where $S_{next}(a)$ is the resulting state after taking action a in state S, $Q(S_{next}(a))$ and $A_k$ are obtained by decoding $Q_{encoded}(S_{next}(a), A_k)$, encoding Q(S) as:

$$Q_{encoded}(S, A_{k+1}) = \left[\hat{Q}\beta * C_{A_{k+1}} + \max_a [R(a) + Q(S_{next}(a))]\right],$$

where $A_{k+1}=[a_0=a^*, A_k]$, with $a^*$ being the maximum achieving action, and using the $Q_{encoded}(S)$ values in the DQN batch fitting process to obtain the trained DQN. As a result, each stage of the trained DQN is able to extract (decode) the Q value and the corresponding action sequence from its downstream stages, perform its computations and compute a new Q value and a new action sequence (by pre-pending its best action to the extracted action sequence) and pass this result (encode) on to its upstream stages.

According to another embodiment, the training of the DQN may include converting $C_{A_k}$ to a binary bit stream representation and training the DQN to learn and predict the binary bit stream.

Figure 7:
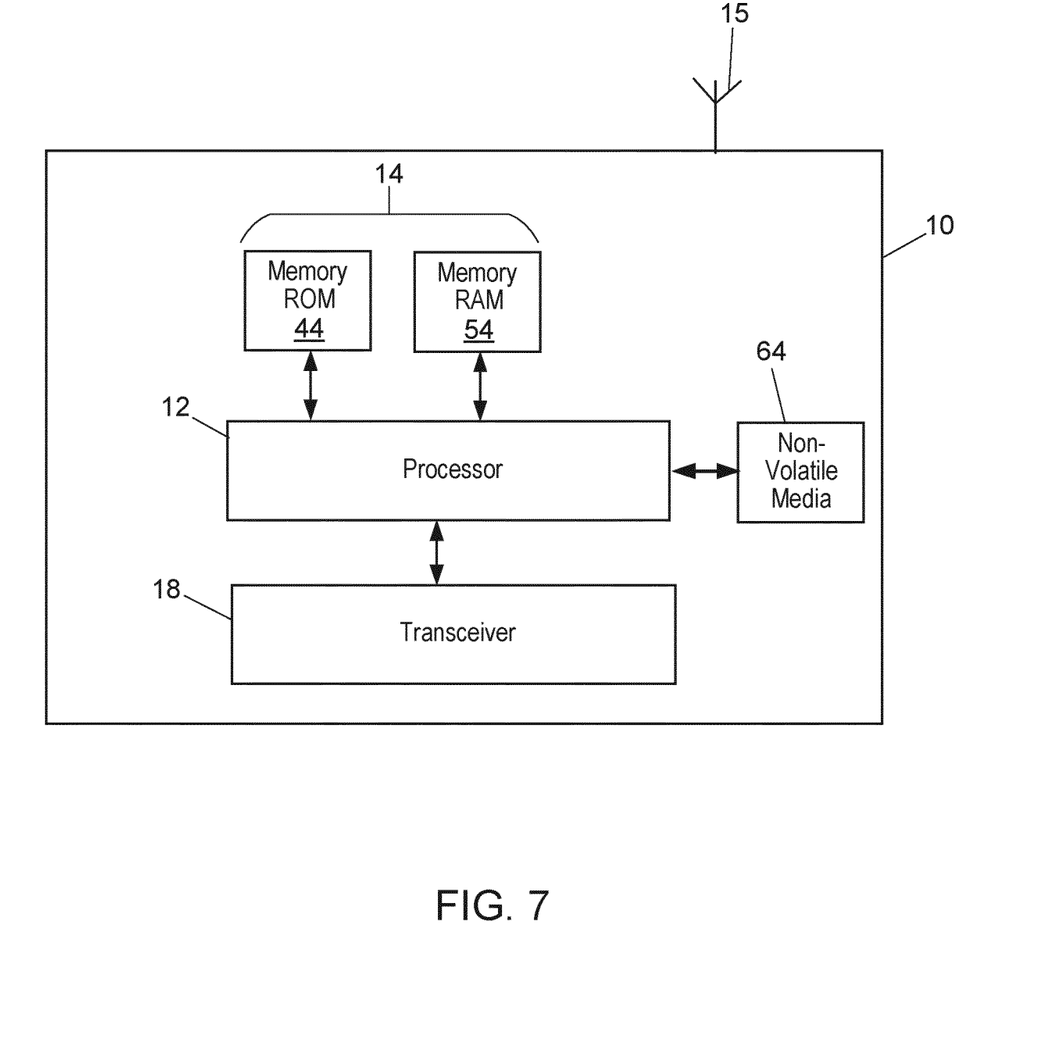
FIG. 7 illustrates an example block diagram of an apparatus, according to certain embodiments.

FIG. 7 illustrates an example of an apparatus 10 according to an example embodiment. In an example embodiment, apparatus 10 may be a node, host, or server in a communications network or serving such a network. For example, apparatus 10 may be a base station, a Node B, an evolved Node B (eNB), 5G Node B or access point, next generation Node B (NG-NB or gNB), WLAN access point, mobility management entity (MME), and/or subscription server associated with a radio access network, such as a LTE network, 5G or NR or other radio systems which might benefit from an equivalent procedure.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 7.

As illustrated in the example of FIG. 7, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 7, multiple processors may be utilized according to other example embodiments. For example, it should be understood that, in certain example embodiments, apparatus 10 may include two or more processors that may form a multiprocessor system (e.g., in this case processor 12 may represent a multiprocessor) that may support multiprocessing. In certain example embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to at least one memory 14 (internal or external), which may be coupled to processor 12, for storing information and instructions that may be executed by processor 12. Memory 14 may be one or more memories and of any type suitable to the local application environment, and may be implemented using any suitable volatile or non-volatile data storage technology such as a semiconductor-based memory device, a magnetic memory device and system, an optical memory device and system, fixed memory, and/or removable memory. For example, memory 14 can be comprised of any combination of random access memory (RAM) 54, read only memory (ROM) 44, non-volatile memory, static storage such as a magnetic or optical disk, hard disk drive (HDD), or any other type of non-transitory machine or computer readable media. For example, in an embodiment, apparatus 10 may include a non-volatile media 64. In an embodiment, non-volatile media 64 may be a removable media. Memory 14 and/or media 64 may store software, computer program code or instructions. The instructions stored in memory 14 or media 64 may include program instructions or computer program code that, when executed by processor 12, enable the apparatus 10 to perform tasks as described herein.

In an example embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some example embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, BT-LE, radio frequency identifier (RFID), ultrawideband (UWB), MulteFire, and the like. The radio interface may include components, such as filters, converters (for example, digital-toanalog converters and the like), mappers, a Fast Fourier Transform (FFT) module, and the like, to generate symbols for a transmission via one or more downlinks and to receive symbols (for example, via an uplink). Transceiver 18 may comprise one or more RF chains for down and/or upconverting RF signals, for example comprising diplexers, front end RF amplifiers, mixers, filters, voltage controlled oscillators and the like, the activation of part or all of which may be activated in accordance with example embodiments.

As such, transceiver 18 may be configured to modulate information on to a carrier waveform for transmission by the antenna(s) 15 and demodulate information received via the antenna(s) 15 for further processing by other elements of apparatus 10. In other example embodiments, transceiver 18 may be capable of transmitting and receiving signals or data directly. Additionally or alternatively, in some example embodiments, apparatus 10 may include an input and/or output device (I/O device).

In an example embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some example embodiments, processor 12 and memory 14 may be included in or may form a part of processing circuitry or control circuitry. In addition, in some example embodiments, transceiver 18 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in example embodiments, apparatus 10 may be a network node or RAN node, such as a base station, access point, Node B, eNB, gNB, WLAN access point, or the like. According to example embodiments, apparatus 10 may be controlled by memory 14 and processor 12 to perform the functions associated with any of the example embodiments described herein, such as the flow diagram illustrated in FIG. 6. Additionally, in certain embodiments, apparatus 10 may include or implement the system illustrated in FIG. 1. In example embodiments, for instance, apparatus 10 may be configured to perform a process for selecting MU-MIMO beams for assignment to one or more UE(s), e.g., using a DQN to maximize total system throughput.

For instance, in some example embodiments, apparatus 10 may be controlled by memory 14 and processor 12 to encode every possible sequence of MU-MIMO beam combinations (i.e., each possible pairing of beam(s) to UE(s)) into a unique numerical value, and to add a Q value into the encoded numerical value to produce a Q encoded value ($Q_{encoded}$). For example, in certain embodiments, each of the beam combinations may have an associated Q value, which is added to the unique numerical value encoding the beam combinations.

According to an embodiment, apparatus 10 may be controlled by memory 14 and processor 12 to provide each of the sequence of beam combinations with a unique designated bin. As a result, each sequence of beam combinations will have its Q encoded value fall within a unique bin and no other sequence of beam combinations will have its Q encoded value fall within that designated bin. In certain embodiments, apparatus 10 may be controlled by memory 14 and processor 12 to pass a matrix comprising a state representation for each of the beam combinations through a DQN that has been trained to output the optimal selection of beam(s). According to one embodiment, apparatus 10 may be controlled by memory 14 and processor 12 to output, by the DQN, one or more optimal beam(s) to assign to one or more UE(s). For example, the DQN may be configured to output a unique identifier of the sequence of selected beam(s) and the maximizing Q value. In other words, in one embodiment, the DQN may be configured to output the Q encoded value ($Q_{encoded}$) for the optimal beam combination(s) that should be selected for assignment to the UE(s). In an embodiment, apparatus 10 may then be controlled by memory 14 and processor 12 to assign, to the UE(s), the optimal beam(s) outputted by the DQN.

According to some embodiments, apparatus 10 may be controlled by memory 14 and processor 12 to train the DQN such that all of the optimal beam(s) are predicted in the first stage of the trained DQN. For instance, the training of the DQN may be such that each stage of a training iteration learns the best action that it can take and the best action sequence from the next stage on. Therefore, once the DQN is trained, during the online process the first stage alone can predict the entire sequence of actions (i.e., $S_t$ is able to predict all the beam selections, so no need to pass $S_{t+1}$, $S_{t+2}$, ... through the DQN).

In an embodiment, apparatus 10 may be controlled by memory 14 and processor 12 to train the DQN by encoding an action sequence, $A_k$, representing an assignment of beam(s) to the UE(s) as code $C_{A_k}$ such that the inverse $C_{A_k}^{-1}$ results in a unique $A_k$, where each said action sequence, $A_k$, is of the form $A_k=[a_0, a_1, \ldots, a_{k-1}]$, $1 \leq k \leq n$, and $a_i \in \{0, 1, \ldots M-1\}$ denotes the beam selected in iteration i, $0 \leq i \leq k-1$. Then, according to an embodiment, a total number of possible action sequences is given by: $L=\Sigma_{k=1}^{n} M_{C_k}$, where $M_{C_k}$ denotes the number of combinations possible when selecting k beams out of M beams, and where M represents the total number of beams, and n represents the maximum number of beams to be selected. According to certain embodiments, limiting the total number of sequences to L may include encoding action sequences after re-arranging the actions in $A_k=[a_0, a_1, \ldots, a_{k-1}]$ such that $a_i < a_{i+1}$.

In some embodiments, the size of the designated bin for each sequence of beam combinations may be given by: $\hat{Q}\beta$, wherein $\hat{Q}$ represents an upper bound on the Q value encountered at any iteration and $\beta \geq 1$ denotes a scale factor that is used for increasing the bin separation, such that $\hat{Q}\beta$ is an integer. Further, in an embodiment, the code $C_{A_k}$ for action sequence $A_k$ is unique across all possible action sequences $A_k$, and the designated bin for action sequence $A_k$ is given by $[\hat{Q}\beta *C_{A_k}, \hat{Q}\beta *(C_{A_k}+1)]$.

According to certain embodiments, apparatus 10 may be controlled by memory 14 and processor 12 to encode Q(S) as $Q_{encoded}(S)=[\hat{Q}\beta*C_{A_k}+Q(S)]$, where Q(S) denotes the Q value for state S with the Q achieving action sequence being $A_k$. Then, given a $Q_{encoded}(S)$, apparatus 10 may be controlled by memory 14 and processor 12 to decode the Q value, Q (S), as follows: $Q(S)=[Q_{encoded}(S, A_k) \% \hat{Q}\beta]$, and to decode $C_A$ as follows: $C_{A_k}=[Q_{encoded}(S, A_k)/\hat{Q}\beta]$ (integer division, i.e., quotient operation).

In one embodiment, apparatus 10 may be further controlled by memory 14 and processor 12 to train the DQN by computing $$Q(S) = \max_a [R(a) + Q(S_{next}(a))],$$

where $S_{next}(a)$ is the resulting state after taking action a in state S, $Q(S_{next}(a))$ and $A_k$ are obtained by decoding $Q_{encoded}(S_{next}(a), A_k)$, encoding Q(s) as:

$$Q_{encoded}(S, A_{k+1}) = \left[\hat{Q}\beta*C_{A_{k+1}} + \max_a [R(a) + Q(S_{next}(a))]\right],$$

where $A_{k+1}=[a_0=a^*, A_k]$, with a* being the maximum achieving action, and using the $Q_{encoded}(S)$ values in the DQN batch fitting process to obtain the trained DQN. As a result, each stage of the trained DQN is able to extract (decode) the Q value and the corresponding action sequence from its downstream stages, perform its computations and compute a new Q value and a new action sequence (by pre-pending its best action to the extracted action sequence) and pass this result (encode) on to its upstream stages.

According to another embodiment, apparatus 10 may be controlled by memory 14 and processor 12 to convert $C_{A_k}$ to a binary bit stream representation and to train the DQN to learn and predict the binary bit stream.

Therefore, certain example embodiments provide several technical improvements, enhancements, and/or advantages. For example, certain embodiments provide methods to quickly and efficiently calculate a MU-MIMO beam selection and user pairing that can outperform conventional heuristic and combinatorial search schemes. In fact, when comparing the performance of example embodiments described herein to popular iterative greedy approaches, the example embodiments outperform those iterative approaches and therefore free up processing time that can be used for other critical tasks in the communications system. As such, example embodiments can improve performance, latency, and/or throughput of networks and network nodes including, for example, access points, base stations/eNBs/gNBs, and mobile devices or UEs. Accordingly, the use of certain example embodiments results in improved functioning of communications networks and their nodes.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and include program instructions to perform particular tasks.

A computer program product may comprise one or more computer-executable components which, when the program is run, are configured to carry out some example embodiments. The one or more computer-executable components may be at least one software code or portions of it. Modifications and configurations required for implementing functionality of an example embodiment may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the example embodiments as discussed above may be practiced with steps in a different order, and/or with hardware elements in configurations which are different than those which are disclosed. Therefore, although some embodiments have been described based upon these example preferred embodiments, it would be apparent to those of skill in the art that certain modifications, variations, and alternative constructions would be apparent, while remaining within the spirit and scope of example embodiments. In order to determine the metes and bounds of the example embodiments, therefore, reference should be made to the appended claims.

I claim:

1. A method, comprising:
encoding every sequence of multi-user multiple-input multiple-output (MU MIMO) beam combinations into a unique numerical value;
adding a Q value into the encoded numerical value to produce a Q encoded value ($Q_{encoded}$);

providing each of the sequence of beam combinations with a unique designated bin;
passing a matrix comprising a state representation through a deep Q network (DQN); and
outputting, by the deep Q network (DQN), one or more optimal beams to assign to a user equipment (UE).

2. The method according to claim 1, wherein the outputting further comprises outputting the Q encoded value ($Q_{encoded}$) of said one or more optimal beams.

3. The method according to claim 1, further comprising assigning, to the user equipment (UE), said one or more optimal beams outputted by the deep Q network (DQN).

4. The method according to claim 1, wherein the deep Q network (DQN) is trained such that, in a first stage of the trained deep Q network (DQN), all of said one or more optimal beams are predicted.

5. The method according to claim 1, further comprising training the deep Q network (DQN), wherein the training comprises:
encoding an action sequence, $A_k$, representing an assignment of beam(s) to the user equipment (UE) as code $C_{A_k}$ such that the inverse $C_{A_k}^{-1}$ results in a unique $A_k$;
wherein each said action sequence, $A_k$, is of the form $A_k=[a_0, a_1, \ldots, a_{k-1}]$, $1 \leq k \leq n$, and $a_i \in \{0, 1, \ldots M-1\}$ denotes the beam selected in iteration i, $0 \leq i \leq k-1$;
wherein a total number of possible action sequences is given by:
$L=\Sigma_{k=1}^n M_{C_k}$, where $M_{C_k}$ denotes the number of combinations possible when selecting k beams out of M beams; and
wherein M represents the total number of beams, and n represents the maximum number of beams to be selected.

6. The method according to claim 5, wherein limiting the total number of sequences to L comprises encoding action sequences after re-arranging the actions in $A_k=[a_0, a_1, \ldots, a_{k-1}]$ such that $a_i < a_{i+1}$.

7. The method according to claim 1, wherein a size of the designated bin for each sequence of beam combinations is given by: $\hat{Q}B$, wherein $\hat{Q}$ represents an upper bound on the Q value encountered at any iteration and $\beta \geq 1$ denotes a scale factor that is used for increasing the bin separation, such that $\hat{Q}\beta$ is an integer.

8. An apparatus, comprising:
at least one processor; and
at least one memory comprising computer program code, the at least one memory and computer program code configured, with the at least one processor, to cause the apparatus at least to
encode every sequence of multi-user multiple-input multiple-output (MU MIMO) beam combinations into a unique numerical value;
add a Q value into the encoded numerical value to produce a Q encoded value ($Q_{encoded}$);
provide each of the sequence of beam combinations with a unique designated bin;
pass a matrix comprising a state representation for each of the beam combinations through a deep Q network (DQN); and
output, by the deep Q network (DQN), one or more optimal beams to assign to a user equipment (UE).

9. The apparatus according to claim 8, wherein the at least one memory and computer program code are further configured, with the at least one processor, to cause the apparatus at least to output the Q encoded value ($Q_{encoded}$) of said one or more optimal beams.

10. The apparatus according to claim 8, wherein the at least one memory and computer program code are further configured, with the at least one processor, to cause the apparatus at least to assign, to the user equipment (UE), said one or more optimal beams outputted by the deep Q network (DQN).

11. The apparatus according to claim 8, wherein the deep Q network (DQN) is trained such that, in a first stage of the trained deep Q network (DQN), all of said one or more optimal beams are predicted.

12. The apparatus according to claim 8, wherein the at least one memory and computer program code are further configured, with the at least one processor, to cause the apparatus at least to train the deep Q network (DQN), wherein the training comprises:
encoding an action sequence, $A_k$, representing an assignment of beam(s) to the user equipment (UE) as code $C_{A_k}$ such that the inverse $C_{A_k}^{-1}$ results in a unique $A_k$;
wherein each said action sequence, $A_k$, is of the form $A_k=[a_0, a_1, \ldots, a_{k-1}]$, $1 \leq k \leq n$, and $a_i \in \{0, 1, \ldots M-1\}$ denotes the beam selected in iteration i, $0 \leq i \leq k-1$;
wherein a total number of possible action sequences is given by:
$L=\Sigma_{k=1}^n M_{C_k}$, where $M_{C_k}$ denotes the number of combinations possible when selecting k beams out of M beams; and
wherein M represents the total number of beams, and n represents the maximum number of beams to be selected.

13. The apparatus according to claim 8, wherein limiting the total number of sequences to L comprises encoding action sequences after re-arranging the actions in $A_k=[a_0, a_1, \ldots, a_{k-1}]$ such that $a_i < a_{i+1}$.

14. The apparatus according to claim 8, wherein a size of the designated bin for each sequence of beam combinations is given by: $\hat{Q}B$, wherein $\hat{Q}$ represents an upper bound on the Q value encountered at any iteration and $\beta \geq 1$ denotes a scale factor that is used for increasing the bin separation, such that $\hat{Q}B$ is an integer.

15. The apparatus according to claim 8, wherein the code $C_{A_k}$ for action sequence $A_k$ is unique across all possible action sequences $A_k$, and the designated bin for action sequence $A_k$ is given by $[Q\beta^* C_{A_k}, Q\beta^*(C_{A_k}+1)]$.

16. The apparatus according to claim 8, wherein the at least one memory and computer program code are further configured, with the at least one processor, to cause the apparatus at least to:
encode Q(S) as $Q_{encoded}(S)=[\hat{Q}B^* C_{A_k}+Q(S)]$, wherein Q(S) denotes the Q value for state S with the Q achieving action sequence being $A_k$.

17. The apparatus according to claim 8, wherein given a $Q_{encoded}(S)$, the at least one memory and computer program code are further configured, with the at least one processor, to cause the apparatus at least to:
decode the Q value, Q(S), as follows: $Q(S)=[Q_{encoded}(S, A_k) \% \hat{Q}B]$; and
decode $C_{A_k}$ as follows: $C_{A_k}=[Q_{encoded}(S, A_k)/\hat{Q}\beta]$.

18. The apparatus according to claim 8, wherein the training of the deep Q network (DQN) further comprises:
computing $Q(S)=\max[R(a)+Q(S_{next}(a))]$, wherein $S_{next}(a)$ is the resulting state after taking action a in state S, $Q(S_{next}(a))$ and $A_k$ are obtained by decoding $Q_{encoded}(S_{next}(a), A_k)$;
encoding Q(S) as:
$Q_{encoded}(S, A_{k+1})=[\hat{Q}B^* C_{A_{k+1}}+\max_a[R(a)+Q(S_{next}(a))]]$, wherein $A_{k+1}=[a_0=a^*, A_k]$, with $a^*$ being the maximum achieving action; and using the $Q_{encoded}(S)$ values in the deep Q network (DQN) batch fitting process to obtain the trained deep Q network (DQN).

19. The apparatus according to claim 8, wherein the training of the deep Q network (DQN) further comprises:
converting $C_{A_k}$ to a binary bit stream representation and training the deep Q network (DQN) to learn and predict said binary bit stream.

20. A non-transitory computer readable medium comprising program instructions stored thereon for performing at least the method according to claim 1.

* * * * *